United States Patent [19]

Rauchwerger

[11] Patent Number: 5,553,479
[45] Date of Patent: Sep. 10, 1996

[54] THRESHOLD LEVEL CALIBRATION METHOD AND APPARATUS

[75] Inventor: George P. Rauchwerger, Sunnyvale, Calif.

[73] Assignee: Flowline Inc., Seal Beach, Calif.

[21] Appl. No.: 36,495

[22] Filed: Mar. 24, 1993

[51] Int. Cl.$^6$ ............ G01D 18/00; G01F 25/00; G01F 23/26; G01R 35/00
[52] U.S. Cl. ............ 73/1 R; 73/1 H; 73/304 C; 324/679
[58] Field of Search .......... 73/1 R, 1 H, 304 C; 340/501, 511, 620, 661; 324/601, 679, 680, 686, 705, 706

[56] References Cited

U.S. PATENT DOCUMENTS

| | | | |
|---|---|---|---|
| 2,188,628 | 1/1940 | Freystedt | 73/304 |
| 2,852,937 | 9/1958 | Maze | 73/304 |
| 3,243,702 | 3/1966 | Schuck . | |
| 3,535,637 | 10/1970 | Goransson | 73/1 R X |
| 3,680,365 | 8/1972 | Summers | 73/862.542 X |
| 3,710,244 | 1/1973 | Rauchwerger . | |
| 3,720,813 | 3/1973 | Badessa | 73/1 R X |
| 3,740,533 | 6/1973 | Van Zeggelaar | 73/1 R X |
| 3,797,311 | 3/1974 | Blanchard et al. | 73/304 C |
| 3,864,974 | 2/1975 | Rauchwerger | 73/304 C |
| 3,890,836 | 6/1975 | McKenzie et al. | 374/1 X |
| 3,913,084 | 10/1975 | Bollinger et al. | 73/660 X |
| 3,958,159 | 5/1976 | Rauchwerger | 317/246 |
| 4,176,396 | 11/1979 | Howatt | 364/185 X |
| 4,201,085 | 5/1980 | Larson | 73/304 C |
| 4,201,093 | 5/1980 | Logan | 73/618 |
| 4,295,370 | 10/1981 | Bristol | 73/304 C |
| 4,404,841 | 9/1983 | Franke et al. | 73/35 |
| 4,530,372 | 7/1985 | Overton et al. | 137/392 |
| 4,570,155 | 2/1986 | Skarmon et al. | 340/531 |
| 4,603,581 | 8/1986 | Yamanoue et al. | 73/304 C |
| 4,619,002 | 10/1986 | Thro | 455/226.2 |
| 4,671,124 | 6/1987 | Seliga | 73/862.53 |
| 4,676,100 | 6/1987 | Eichberger | 73/304 C |
| 4,716,536 | 12/1987 | Blanchard | 73/1 H X |
| 5,017,909 | 5/1991 | Goekler | 340/620 |
| 5,031,068 | 7/1991 | Hansen, III et al. | 361/284 |
| 5,111,683 | 5/1992 | Fond | 73/3 |
| 5,162,748 | 11/1992 | Katz | 330/149 |
| 5,372,029 | 12/1994 | Brandes | 73/1 R |

FOREIGN PATENT DOCUMENTS

| 8443 | 6/1991 | WIPO | 73/1 R |
|---|---|---|---|

*Primary Examiner*—Thomas P. Noland
*Attorney, Agent, or Firm*—Pretty, Schroeder, Brueggemann & Clark

[57] ABSTRACT

A threshold calibration method and apparatus calibrates a reference voltage representing a selected threshold and compares the reference voltage with a measurement voltage representing a variable parameter to indicate the condition of the variable parameter. The reference voltage is set by causing the variable parameter to assume a predetermined high value and adjusting a first potentiometer to provide a first calibration voltage equal to the measurement voltage representing the high value. The variable parameter is then caused to assume a predetermined low value and a second potentiometer is adjusted to provide a second calibration voltage equal to the measurement voltage representing the low value. The first and second calibration voltages are then combined using passive resistive components to provide a reference voltage representing the selected threshold.

21 Claims, 1 Drawing Sheet

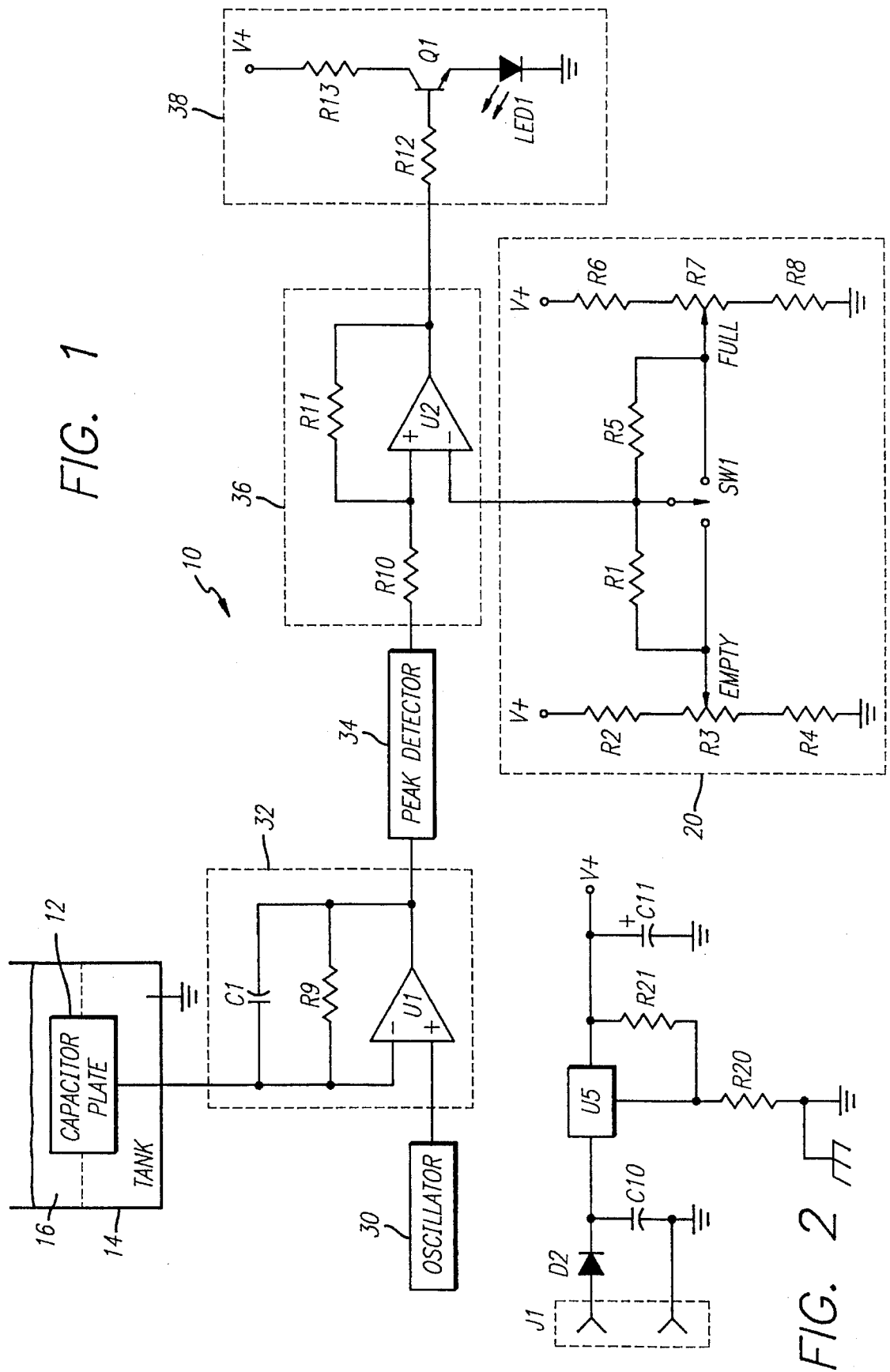

THRESHOLD LEVEL CALIBRATION METHOD AND APPARATUS

BACKGROUND OF THE INVENTION

The present invention relates to a method and an apparatus for establishing a calibrated reference value representing a threshold and for comparing the reference value with a signal representing a variable parameter to determine the variable parameter's condition.

A wide variety of methods exist for calibrating a reference value which can be used to determine when a signal representing a variable parameter increases past a predetermined threshold. In a typical method using an electronic system, a transducer of a sensor circuit detects a variable physical parameter and produces a corresponding sensor voltage signal (or current signal) that represents the condition of the physical parameter. The sensor voltage signal is then compared with a reference voltage representing the reference value. Typically, the reference voltage is provided by an electronic calibration circuit that includes a precision potentiometer having an adjustable wiper that divides a supply voltage. The reference voltage is established by directing the physical parameter to the desired level and adjusting the potentiometer until the output voltage from the potentiometer equals the sensor voltage signal when the physical parameter is at the desired level. Typically, a comparator circuit is used to compare the reference voltage with the sensor voltage signal.

The method for setting a reference voltage described briefly above requires directing the physical parameter to assume the desired threshold. Sometimes, however, this may not be possible. For example, an accurate determination of the physical parameter may not be available or may be available only for two extreme conditions of the physical parameter. Alternatively, setting and holding the physical parameter at the threshold may be burdensome, inefficient, or otherwise uneconomical. When the physical parameter cannot be held at the threshold, then the reference voltage must be otherwise determined in order for the circuit to be able to indicate when the physical parameter has achieved the calibrated threshold.

Therefore, there is a need to develop a simple method and apparatus to accurately establish a calibrated reference voltage representing a threshold without requiring the physical parameter to be at the corresponding threshold before the reference can be calibrated. In addition, there is a need to develop a method and apparatus to monitor the physical parameter and indicate whether the threshold has been overcome.

SUMMARY OF THE INVENTION

The present invention is embodied in an apparatus, and related method, for selecting a calibrated threshold and comparing a variable parameter with the selected threshold without preliminarily requiring the parameter to be at the corresponding threshold when the threshold is selected. The apparatus includes a measuring circuit for providing a measurement signal representing the variable parameter and a calibration circuit for providing a reference value representing the threshold. The measuring circuit monitors the variable parameter and compares it with the selected threshold by comparing the measurement signal with the reference value. The variable parameter can vary in a range between a predetermined low and high value.

To calibrate the reference value, the variable parameter is caused to assume a first condition at the predetermined high value of the range, whereupon the measuring circuit provides a first signal representative of the first condition. With the variable parameter at the first condition, the calibration circuit is adjusted to provide a first calibration value equal to the first signal. The variable parameter is then caused to assume a second condition at a predetermined low value of the range, whereupon the measuring circuit provides a second signal representative of the second condition. With the variable parameter at the second condition, the calibration circuit is adjusted to provide a second calibration value equal to the second signal. The calibration circuit is then set to average the first and second calibration value to provide a reference value midway between the first and second signals that represents the selected threshold. After the reference value is set, the measuring circuit monitors the variable parameter and compares the measurement signal with the reference value to determine the condition of the variable parameter.

In a more detailed feature of the invention, the measurement signal, the first and second signals, and the reference value are voltage levels. The calibration circuit includes two potentiometers and two isolation resistors. One potentiometer has its wiper set to provide a first calibration voltage equal to the voltage of the first signal. The other potentiometer has its wiper set to provide a second calibration voltage equal to the voltage of the second signal. The isolation resistors are used to combine the first and second calibration voltages to produce a reference voltage having a value midway between the first and second calibration voltages without using an active circuit element.

The embodiment of the invention can be used, for example, in a system for measuring the level of liquid in a tank in which the variable parameter discussed above represents the level of liquid in the tank. A capacitance sensor having first and second conductors detects the level in the tank. The first conductor is a conductive plate placed on the tank wall. The tank wall at the location of the plate is insulating. The second conductor is either the liquid, if the liquid is conducting, or the ground, if the liquid is not conducting. The first condition is a full tank and the second condition is an empty tank. The selected threshold represents a liquid level in the tank which is midway between a full tank and an empty tank.

In another more detailed feature of the invention, the measuring circuit includes a threshold detection circuit that uses an oscillator and a sensor amplifier to detect the capacitance of the capacitance sensor and a comparator circuit. The capacitance sensor and the oscillator are connected to the sensor amplifier. The sensor amplifies an oscillating signal from the oscillator to provide a sensor signal, the gain of the sensor amplifier varying in proportion to the capacitance of the sensor. The sensor signal is compared with the reference voltage by the comparator circuit. The comparator circuit switches on a light emitting diode (LED) coupled to the output of the comparator circuit whenever the sensor signal is greater than the reference voltage from the calibration circuit. The LED, when switched on, significantly increases the current draw of the apparatus. This increase in current draw can be used to indicate the condition of the variable parameter.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 1 is a block diagram of the calibration and threshold monitoring system embodying the invention.

FIG. 2 is a schematic diagram of a power regulation circuit for supplying power to the calibration and threshold monitoring system shown in FIG. 1.

DESCRIPTION OF THE PREFERRED EMBODIMENT

With reference now to the drawings and, more particularly to FIG. 1, there is shown a threshold level detection system 10 for determining whether a physical parameter has reached a threshold value. In the detection system, the physical parameter to be measured is the level of liquid 12 in a tank. Attached to the tank 14 is a capacitance sensor having a capacitor plate 16 that provides a capacitance value that varies with the level of the liquid in the tank. The capacitance value is converted into a voltage signal by a measuring circuit having an oscillator 18, a sensor amplifier 20 and a peak detector 22. A comparator 24 compares the voltage signal with a reference voltage provided by a calibration circuit 26. The output of the comparator 24 controls the state of an LED circuit 28.

The typical capacitance sensor includes two conductors separated by an insulating layer. The tank 14 is typically made of an insulating non-metallic material and forms the insulating layer of the capacitance sensor. In some embodiments, only the portion of the tank wall that has the sensor may be insulating while the rest of the tank wall is metal. Secured to the outside of the insulated tank wall in a vertical fashion is a capacitor plate 16. The capacitance plate is a conductor and forms one of the conductors of the capacitance sensor. Inside the tank 14 is a liquid 12 that if conductive, can be grounded to form the other conductor of the capacitance sensor. Alternatively, the liquid, if nonconductive, forms part of the dielectric of the capacitance sensor along with the insulating tank wall. The capacitance of the sensor increases as the liquid level in the tank increases. The change of capacitance is measured and indicated by an electronic circuit.

The inputs of the sensor amplifier 20 are coupled to the oscillator 18 and the capacitor plate 16. The sensor amplifier amplifies an oscillating signal from the oscillator with a gain that varies in proportion to the capacitance at the capacitor plate. The amplitude of the signal from the sensor amplifier is detected by the peak detector 22. A voltage from the peak detector, which represents the peak amplitude of the detected voltage signal, is compared by the comparator 24 with the calibration voltage from the calibration circuit 26. If the voltage signal from the peak detector falls below the level of the calibration voltage, the comparator causes the LED circuit 28 to indicate that the liquid level in the tank is below a midpoint threshold of the tank 14.

The calibration circuit 26 includes two variable resistors R1 and R2, two isolation resistors R3 and R4 and a three-positioned switch SW1. The variable resistors R1 and R2 preferably take the form of a potentiometer having a wiper.

The first variable resistor R1 is connected to two bias resistors R5 and R6 which maintain a certain voltage between the power supply voltage and the output voltage provided at the wiper of the first variable resistor. The first isolation resistor R3 is connected between the wiper of the first variable resistor and the output of the calibration circuit 26. The second variable resistor R2 is connected to two bias resistors R7 and R8, which maintain a certain voltage between the power supply voltage and the output voltage provided at the wiper of the second variable resistor. The second isolation resistor R4 is connected between the wiper of the second variable resistor and the output of the calibration circuit.

The isolation resistors R3 and R4 are of equal value and of a larger resistance value than the two variable resistors R1 and R2. The output of the calibration circuit 26 is coupled to a high impedance input of the comparator 24. The output voltage of the calibration circuit (the output voltage is the voltage at the connection between isolation resistors R3 and R4) is the reference voltage and is generally the average of the voltage representing an empty tank and the voltage representing a full tank voltage.

The three-position switch SW1 is coupled between the output of the calibration circuit 26 and the wipers of the first and second variable resistors R1 and R2. The middle position of the switch SW1 is the normal operating position of the switch and has no connection. The empty position of the switch is used to calibrate the voltage representing an empty tank. The full position of the switch is used to calibrate the voltage representing a full tank.

To calibrate the reference voltage, the tank 14 is emptied and the switch SW1 is set to the empty position, which bypasses resistor R3 and connects the output of the calibration circuit 26 directly to the wiper of the first variable resistor R1. The wiper of the first variable resistor R1 is then adjusted such that the voltage from the output of calibration circuit 26 is equal to the empty voltage signal present at the other input of the comparator 24.

Continuing the calibration sequence, the tank 14 is filled with liquid and switch SW1 is set to the full position, which bypasses resistor R4 and connects the output of the calibration circuit 26 directly to the wiper of the second variable resistor R2. The wiper of the second variable resistor R2 is then adjusted until the voltage at the output of the calibration circuit is equal to the full voltage signal at the other input of the comparator 24. The order of calibrating the reference voltage is not critical. Thus, the calibration sequence can first fill the tank and then empty the tank in setting the full voltage signal and the empty to voltage signal.

After the empty and full liquid level calibrations are performed, the switch SW1 is set to the middle position having no connection. The isolation resistors R3 and R4 are chosen to have a resistance such that the voltage from the wiper of variable resistor R1 and the voltage from the variable resistor R7 are combined when the switch is set to the middle position to produce at the output of the calibration circuit 26 a reference voltage that is substantially an average value midway between the first and second calibration voltages. In the preferred embodiment, the resistance value of the bias resistors R5 and R7 is 10 kilohms, the resistance value of the bias resistors R6 and R8 is 17.8 kilohms, the resistance value of the isolation resistors R3 and R4 is 100 kilohms and the resistance value of the variable resistors R1 and R2 is 10 kilohms.

The output of the oscillator 18 is connected to the non-inverting input of the operational amplifier U1 of amplifier 20. The capacitor plate 16, which capacitively senses the level of liquid 12 in the tank 14, is connected to the inverting input of the operational amplifier U1. A feedback impedance is coupled between the output of the amplifier U1 and its inverting input. The output of the operational amplifier U1 is coupled to the peak detector 22 through a coupling capacitor (not shown). The feedback impedance consists of a resistor R9 and a capacitor C1. In the preferred embodiment, the resistance value of the resistor R9 is 10 megohm and the capacitance value of the capacitor C1 is 8 picofarads.

The output of the peak detector 22 is connected through a resistor R10 to the non-inverting input of an operational amplifier U2 of the comparator 24. The operational amplifier U2 has positive feedback from its output through a resistor R11 into its noninverting input. The reference voltage from the calibration circuit 26 is fed into the inverting input of the operational amplifier U2. Therefore, when the voltage signal applied at the non-inverting input of the operational amplifier exceeds the reference voltage applied at the inverting input, the output of the operation amplifier is driven positive until the output reaches the saturation voltage of the operational amplifier. The preferred embodiment, the resistance value of resistor R10 is 33 kilohms and of resistor R11 is 15 megohms.

The output voltage of the operational amplifier U2 is coupled through a resistor R12 to the base of a transistor Q1 of the LED circuit 28. When the output of operational amplifier is positive, the transistor is switched on allowing a current to flow from the positive power source through the bias resistor R13 to turn on the light-emitting diode LED1. The preferred value of resistors R12 is 10 kilohms and R13 is 470 ohms.

With reference now to FIG. 2, a power supply 30 provides a voltage V+to the detection system 10 and provides a current signal indicating the condition of the liquid level. An unregulated supply voltage of 36 volt dc passes through a connector J1 to the power supply. A diode D1 prevents a reverse current flow. The unregulated supply voltage is applied to the input of a voltage regulator U3. Two resistors R14 and R15 bias the voltage regulator to provide a power supply voltage V+of 9 volts. In the preferred embodiment, the resistance value of the resistor R14 is 6.98 kilohms and of the resistor R15 is 1.2 kilohms. The capacitors C2 and C3 function to smooth voltage ripples. The preferred capacitance value of the capacitor C2 is 0.1 microfarads and of the capacitor C3 is 1 microfarad.

The current from the power supply 30 also functions as a threshold indication. When the light-emitting diode LED1 is off, the current draw through the power supply for all of the circuitry of the detection system 10 is approximately 4 milliamps. When the light-emitting diode LED1 is on, the current draw through the power supply increases to approximately 20 milliamps. This variation in supply current through the power supply can be used to indicate that the threshold level has been obtained without the need for an additional conversion circuit.

From the foregoing, it will be appreciated that the threshold level detection system of the preferred embodiment of the invention allows a threshold to be established without requiring a physical parameter to be preliminarily held at a level corresponding to the threshold. The system also provides a reference voltage representing the threshold by using merely passive resistive components and a three position switch. Further, the system provides a current signal indicating the condition of the physical parameter without requiring an additional voltage-to-current conversion circuit.

Although the foregoing discloses preferred embodiments of the present invention, it is understood that those skilled in the art may make various changes to the preferred embodiment shown without departing from the scope of the invention. The invention is defined only by the following claims.

I claim:

1. A method of comparing a variable parameter with a selected threshold, the method using a measuring circuit for monitoring the variable parameter which represents a range of conditions and a calibration circuit for providing the selected threshold, comprising the steps of:

causing the variable parameter to assume a first condition at a predetermined high value of the range, whereupon the measuring circuit monitoring the variable parameter provides a first signal;

adjusting the calibration circuit to provide a first calibration value to be equal to the first signal;

causing the variable parameter to assume a second condition at a predetermined low value of the range, whereupon the measuring circuit monitoring the variable parameter provides a second signal;

adjusting the calibration circuit to provide a second calibration value to be equal to the second signal;

setting the calibration circuit to combine the first and second calibration values to produce a reference value midway between the first and second signals without causing the variable parameter to assume a condition that corresponds to the reference value, when the reference value is set, the reference value representing the selected threshold; and monitoring the variable parameter using the measuring circuit to provide a measurement signal representative of the condition of the variable parameter and comparing the measurement signal with the reference value to provide an indication of the condition of the variable parameter.

2. A method of comparing a variable parameter as defined in claim 1, wherein:

the first and second signals and the first and second calibration values are voltage levels;

the step of adjusting the calibration circuit to provide a first calibration value comprises the steps of
      coupling a first potentiometer to a voltage source, the calibration circuit including the first potentiometer, and
      adjusting a wiper of the first potentiometer until the first calibration value is equal to the first signal; and the step of adjusting the calibration circuit to provide a second calibration value comprises the steps of
      coupling a second potentiometer to a voltage source, the calibration circuit including the second potentiometer, and
      adjusting a wiper of the second potentiometer until the second calibration value is equal to the second signal.

3. A method of comparing a variable parameter as defined in claim 2, wherein the step of setting the calibration circuit to combine the first and second calibration values to produce a reference value comprises the steps of:

coupling a first isolation resistor between the wiper of the first potentiometer and a terminal of the calibration circuit; and a coupling a second isolation resistor between the wiper of the second potentiometer and the terminal of the calibration circuit.

4. A method of comparing a variable parameter as defined in claim 1, wherein the variable parameter represents the amount of a liquid in a tank monitored by a capacitance sensor;

the step of causing the variable parameter to assume the first condition to provide the first signal comprises the steps of filling the tank with the liquid until the tank is substantially full of the liquid, sensing a capacitance from the capacitance sensor, the capacitance sensor having first and second conductors separated by an insulator, wherein the first conductor includes a plate attached to the tank, the second conductor includes the liquid, and the insulator includes the tank, and wherein the first conductor does not contact the liquid, and providing a first signal corresponding the capacitance of the capacitance sensor when the tank is substantially full of liquid; and the step of causing the variable parameter to assume the second condition to provide the second signal comprises the steps of emptying the liquid from the tank until the tank is substantially empty, and providing a second signal corresponding the capacitance of the capacitance sensor when the tank is substantially empty.

5. A method of comparing a variable parameter as defined in claim 4, wherein:

the step of providing the first voltage signal comprises the steps of oscillating a signal at a constant frequency and amplitude, amplifying the oscillating signal by an amount that varies in proportion to the capacitance of the capacitor sensor, detecting the peak voltage of the amplified signal, and maintaining the peak voltage to provide the first voltage signal; and the step of providing the second voltage signal comprises the steps of oscillating a signal at a constant frequency and amplitude, amplifying the oscillating signal by an amount that varies in proportion to the capacitance of the capacitor sensor, detecting the peak voltage of the amplified signal, and maintaining the peak voltage to provide the second voltage signal.

6. A method of comparing a variable parameter as defined in claim 1, wherein:

the variable parameter represents the amount of a liquid in a tank monitored by a capacitance sensor;

the step of causing the variable parameter to assume the first condition to provide the first signal comprises the steps of filling the tank with the liquid until the tank is substantially full of the liquid, sensing a capacitance from the capacitance sensor, the capacitance sensor having first and second conductors separated by an insulator, wherein the first conductor includes a plate attached to the tank, the second conductor includes a ground, and the insulator includes the tank and the liquid, and wherein the first conductor does not contact the liquid, and providing the first signal corresponding the capacitance of the capacitance sensor when the tank is substantially full of liquid; and the step of causing the variable parameter such as a liquid in a tank monitored by a capacitance sensor to assume the second condition to provide the second signal comprises the steps of emptying a tank of liquid until the tank is substantially empty; and providing the second voltage signal corresponding the capacitance of the capacitance sensor when the tank is substantially empty.

7. A method of comparing a variable parameter as defined in claim 1, and further comprising the step of indicating the condition of the variable by causing the measuring circuit to draw an increased current when the variable voltage is greater than the reference voltage.

8. A method of comparing a variable parameter with a selected threshold as defined in claim 1, further comprising:

providing the measuring circuit for monitoring the variable parameter, the measuring circuit including a sensor having a conductive plate, wherein the conductive plate exhibits a capacitance representing a variable physical condition;

an oscillator providing an oscillating signal of substantially constant amplitude and frequency;

an amplifier coupled to the oscillator for amplifying the oscillation signal to provide the measurement signal, the gain of the amplifier varying in accordance with the capacitance exhibited by the conductive plate;

providing the calibration circuit that provides the selected threshold, the calibration circuit including first and second potentiometers coupled to a voltage source, first and second isolation resistors, the first isolation resistor coupled between an output terminal and the wiper of the first potentiometer, and the second isolation resistor coupled between the output terminal and the wiper of the second potentiometer, and a switch having first, second and third positions, the switch connected between the wipers of the first and second potentiometers and the output terminal such that when the switch is set to the first position, the wiper of the first potentiometer is connected to the output terminal so that the wiper of the first potentiometer can be adjusted until the voltage at the wiper is equal to the first measured signal corresponding to a first physical condition to provide the first calibration value, such that when the switch is set to the second position, the wiper of the second potentiometer is connected to the output terminal so that the wiper of the second potentiometer can be adjusted until the voltage at the wiper is equal to the second measured signal corresponding to a second physical condition to provide the second calibration value, and such that when the switch is set to the third position, the reference value is provided at the output terminal and is substantially the average of the voltages at the wipers of the first and second potentiometers; and wherein comparing the measurement signal with the reference value includes providing a comparator coupled to the amplifier and the calibration circuit for comparing the reference value and the measurement signal, and indicating whether the measurement signal is greater than the reference value.

9. A threshold detection circuit comprising:

a sensor having a conductive plate, wherein the conductive plate exhibits a capacitance representing a physical parameter;

an oscillator providing an oscillating signal of substantially constant amplitude and frequency;

an amplifier coupled to the oscillator for amplifying the oscillation signal to provide a sensor signal, the gain of the amplifier varying in accordance with the capacitance exhibited by the conductive plate;

a calibration circuit for setting a reference voltage and for providing the reference voltage at an output terminal, the calibration circuit including
first and second potentiometers coupled to a voltage source,
first and second isolation resistors, the first isolation resistor coupled between the output terminal and a wiper of the first potentiometer, and the second isolation resistor coupled between the output terminal and a wiper of the second potentiometer, and
a switch having first, second and third positions, the switch connected between the wipers of the first and second potentiometers and the output terminal;

wherein, when the switch is set to the first position, the wiper of the first potentiometer is connected to the output terminal so that the wiper of the first potentiometer can be adjusted until the voltage at the wiper is equal to the sensor signal corresponding to a first condition of the physical parameter, wherein, when the switch is set to the second position, the wiper of the second potentiometer is connected to the output terminal so that the wiper of the second potentiometer can be adjusted until the voltage at the wiper is equal to the sensor signal corresponding to a second condition of the physical parameter, and wherein, when the switch is set to the third position, the reference voltage is provided at the output terminal and is substantially the average of the voltages at the wipers of the first and second potentiometers; and a comparator coupled to the amplifier and the calibration circuit for comparing the reference voltage and the sensor signal, the comparator indicating whether the sensor signal is greater than the reference voltage.

10. A threshold detection circuit as defined in claim 9, wherein:

the physical parameter represented by the capacitance of the conductive plate is the amount of a liquid inside a tank;

the first condition of the physical parameter occurs when the tank is substantially full of liquid; and the second condition of the physical parameter occurs when the tank is substantially empty.

11. A threshold detection circuit as defined in claim 10, wherein:

the tank and the liquid are insulators; and the circuit further comprises a ground conductor separated from the conductive plate by the tank and the liquid.

12. A threshold detection circuit as defined in claim 11, wherein the conductive plate contacts the tank and does not contact the liquid.

13. A threshold detection circuit as defined in claim 9, wherein the comparator draws an increased current when the voltage of the sensor signal is greater than the reference voltage.

14. A calibration circuit for providing a reference voltage, comprising:

a voltage source having a positive terminal and a negative terminal;

first and second potentiometers each having first and second supply terminals and a wiper terminal, the first supply terminal coupled to the positive terminal of the voltage source and the second supply terminal coupled to the negative terminal of the voltage source, each potentiometer having a fixed resistance between the first and second input terminals, the wiper terminal being coupled to a wiper that slides along the fixed resistance such that the voltage at the wiper terminal varies as the wiper is moved along the fixed resistance, wherein the voltage at the wiper terminal of the first potentiometer is set to represent a first condition and wherein the voltage at the wiper terminal of the second potentiometer is set to represent a second condition;

a switch having first and second switch terminals and an output terminal, the first switch terminal connected to the wiper terminal of first potentiometer and the second switch terminal connected to the wiper terminal of the second potentiometer, the switch having first and second positions such that the output terminal is coupled to the first input terminal in the first position and to the second input terminal in the second position; and first and second isolation resistors, the first isolation resistor coupled between the wiper terminal of the first potentiometer and the output terminal of the switch, and the second isolation resistor coupled between the wiper terminal of the second potentiometer and the output terminal of the switch, wherein the calibration circuit provides the reference voltage at the output terminal of the switch when the switch is in a third position.

15. A calibration circuit as defined in claim 14, and further comprising first and second bias resistors, the first bias resistor coupled between the first supply terminal of the first potentiometer and the positive terminal of the voltage source and the second bias resistor coupled between the first supply terminal of the second potentiometer and the positive terminal of the voltage source.

16. A calibration circuit as defined in claim 15, further comprising third and fourth bias resistors, the third bias resistor coupled between the second supply terminal of the first potentiometer and the negative terminal of the voltage source, and the fourth bias resistor coupled between the second supply terminal of the second potentiometer and the positive terminal of the voltage source.

17. A threshold level calibration circuit for monitoring a parameter that varies between a predetermined low value and a predetermined high value, comprising:

a sensor circuit having a sensor that monitors the variable parameter and provides a variable measurement signal representative of the variable parameter;

calibration means for providing a reference signal representative of a predetermined threshold, wherein the reference signal is produced by automatically combining a low measurement signal provided by the sensor circuit when the variable parameter is at the predetermined low value and a high measurement signal provided by the sensor circuit when the variable parameter is at the predetermined high value, such that the reference signal is substantially the average of the low measurement signal and the high measurement signal, without requiring the variable parameter to be at a value corresponding to the reference signal, when the reference signal is produced; and a comparator that compares the variable measurement signal with the reference signal, to indicate the condition of the variable parameter.

18. A threshold level calibration circuit as defined in claim 17, wherein:

the calibration means comprises
first and second potentiometers, each potentiometer being coupled to a voltage source and having a wiper, first and second isolation resistors, the first isolation resistor coupled between an output terminal of the calibration means and the wiper of the first potentiometer, and the second isolation resistor coupled between the output terminal and the wiper of the second potentiometer, and a switch having first, second and third positions, the switch connected between the wipers of the first and second potentiometers and the output terminal such that when the switch is set to the first position, the wiper of the first potentiometer is connected to the output terminal so that the wiper of the first potentiometer can be adjusted until the voltage at the wiper is equal to the low measurement signal, when the switch is set to the second position, the wiper of the second potentiometer is connected to the output terminal so that the wiper of the second potentiometer can be adjusted until the voltage at the wiper is equal to the high measurement signal, and When the switch is set to the third position, the reference voltage is provided at the output terminal and is substantially the average of the voltages at the wipers of the first and second potentiometers;

the output terminal is coupled to the comparator such that the calibration means provides the reference signal to the comparator; and the comparator indicates whether the measurement signal is greater than the reference signal.

19. A threshold level calibration circuit as defined in claim 17, wherein:

the calibration means comprises first and second potentiometers, the first potentiometer having a wiper that provides a first calibration signal corresponding to the low measurement signal and the second potentiometer having a wiper that provides a second calibration signal corresponding to the high measurement signal; and the wipers of the first and second potentiometers are coupled such that the calibration means provides the reference signal.

20. A threshold level calibration circuit as defined in claim 17, wherein:

the sensor includes a conductive plate to monitor the variable parameter, the conductive plate exhibiting a capacitance representing the variable parameter;

the sensor circuit further includes an oscillator providing an oscillating signal of substantially constant amplitude and frequency, and an amplifier coupled to the oscillator for amplifying the oscillation signal to provide the variable measurement signal, the gain of the amplifier varying in accordance with the capacitance exhibited by the conductive plate;

the calibration means for providing the reference signal at a reference output terminal further includes a calibration circuit for setting and providing the reference signal, the calibration circuit having first and second potentiometers coupled to a voltage source, first and second isolation resistors, the first isolation resistor coupled between the reference output terminal and a wiper of the first potentiometer, and the second isolation resistor coupled between the reference output terminal and a wiper of the second potentiometer, and a switch having first, second and third positions, the switch connected between the wipers of the first and second potentiometers and the reference output terminal such that when the switch is set to the first position, the wiper of the first potentiometers is connected to the reference output terminal so that the wiper of the first potentiometer can be adjusted until the voltage signal at the wiper is equal to the variable measurement signal that corresponds to the predetermined low value, and such that when the switch is set to the second position, the wiper of the second potentiometer is connected to the reference output terminal so that the wiper of the second potentiometer can be adjusted until the voltage signal at the wiper is equal to the variable measurement signal that corresponds to the predetermined high valve, and such that when the switch is set to the third position, the reference signal is provided at the reference output terminal and is substantially the average of the voltage signals at the wipers of the first and second potentiometers; and the comparator is coupled to the sensor circuit and the calibration means, respectively, to compare the variable measurement signal with the reference signal and indicate whether the variable measurement signal is greater than the reference signal.

21. A threshold level calibration circuit as defined in claim 17, wherein the comparator indicates whether the variable measurement signal is greater than the reference signal.

* * * * *